April 16, 1929.   O. J. KUHLKE   1,709,797

PROCESS OF MANUFACTURING PUNCTUREPROOF TUBES

Filed April 14, 1927

INVENTOR.
Otto J. Kuhlke
BY Ely H Barrow
ATTORNEYS

Patented Apr. 16, 1929.

1,709,797

UNITED STATES PATENT OFFICE.

OTTO J. KUHLKE, OF AKRON, OHIO.

PROCESS OF MANUFACTURING PUNCTUREPROOF TUBES.

Application filed April 14, 1927. Serial No. 183,723.

This invention relates to a process of manufacturing an inner tube for a pneumatic tire which is characterized by the provision of a layer of rubber constituting a portion of the inner tube and located at the tread region, which layer of rubber is held under compression within its body portion so as to offer substantial resistance to puncture.

It has been known that a layer of rubber under compression will operate to reduce the liability of puncture, but tubes embodying this feature have not been practical prior to my invention, owing largely to the expense and difficulty of practical manufacture. Heretofore, tubes of this type have been made upon a pole or mandrel and the compression within the layer of puncture resisting material has been obtained by turning the tube inside out in removing from the mandrel. The principal objection to this procedure is the extreme difficulty in removing the tube from the pole, the labor of turning the tube upon itself increasing the expense to such an extent as to make it practically prohibitive.

By this invention, however, the tubes are manufactured, not on a mandrel, but by a full molding or curing operation in which the tubes are molded in circular form in a circular tube mold and while the tubes are under internal pressure. This relieves the manufacturer of the expensive manipulations which are required by the mandrel processes.

It is a further object of the invention to manufacture a tube of the puncture proof variety in which the various elements of the tube are in a state of balance. In tubes of this general type, as manufactured heretofore, the tube is initially placed under strains or stresses which tend to promote rupture of the tube. By the present process, however, no such strains are obtained and the tube is normally in the condition in which it is in service.

It is a further object of the invention to incorporate in the tube a series of fibrous reinforcing elements in the form of a cord or cords, so arranged and located as to hold the rubber of the compression layer or element under further compression than is obtained as the result of the usual manufacturing processes without restricting the free stretching and flexing of the tube and without inducing tearing or breaking along the boundaries of the fabric reinforcement.

The punctureproof tube which is made by the described process is the subject matter of a divisional application Serial No. 210,647, filed August 4, 1927.

Other objects and advantages, both in the process and in the finished product, will flow from the practice of this invention, and it will be further evident that, having explained the invention in such manner that its uses and benefits will be realized by those skilled in this art, modifications or improvements therein may be suggested. The invention, therefore, is not limited to exact conformity to the details shown and described, but is extended to the broad scope of the invention as set out in the claims and as defined and limited by the prior art.

In the manufacture of the tube, a layer of rubber adaptable for forming the puncture proof element of the tube is first prepared. This rubber is shown at 1 and is of a suitable composition which will cure at a different temperature and a longer cure than the tube of which it will become a part and which, when compressed, will be self healing. This strip is formed in a ring about a mold or ring core 2 which is somewhat larger than the diameter of the finished tube. The ring of rubber in cross-section is substantially crescent shaped, tapering down to thin feather edges 3. It will be noted that the core is flared outwardly slightly about the base so that the edges of the strip flare, the purpose being to set up a tendency in the edges to flare inwardly rather than curl outwardly when the strip of rubber is reversed.

Figure 1:
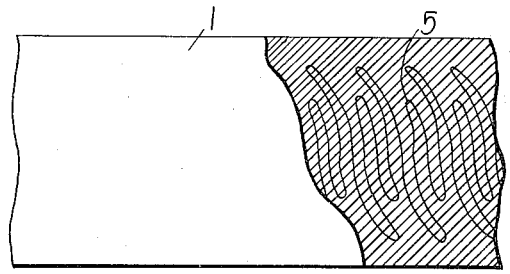
Figure 1 is a plan view of the element relied upon for securing the compression area within the tube, the view being with a portion of the compression layer broken away to expose the cord or fabric members embedded therein.
Figure 2:
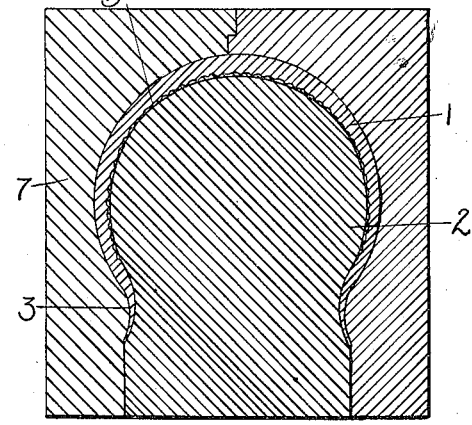
Figure 2 is a section through a mandrel or form upon which the compression element is vulcanized prior to its incorporation in the tube.

In order to increase the compression feature of the rubber, the strip is preferably provided with a layer of cord or cords 5 arranged in the manner shown in Figure 1. The cord shown herein is laid back and forth across the central portion of the compression strip in undulating or ogee curves, the curves being of alternate lengths as shown. The curvature of the cords is preferable to other arrangements because of the fact that a transverse compression is obtained thereby without interfering with the ability of the tube to elongate circumferentially. The ogee curves adapt themselves better to the transverse curvature of the tube and thereby secure better results than if the cords were laid diagonally or parallel to the axis of the tube. By making the curves alternately short and long, a crowding of the cords at the edge of the compression layer will be avoided. It may be remarked, however, that the provision of the cords is an adjunct only and these may be omitted and still great advantages be secured through the use of the other features of the invention.

When the compression layer is built up on the core or form, the fabric reinforcement is located about the inner surface of the layer or next to the core. The layer is then vulcanized about the form, being enclosed in a mold 7 or wrapped before vulcanization. The stock is preferably compounded so that it will take what is known as a long cure, i. e., about 30 minutes, before a state of complete vulcanization is secured. It should be remarked, however, that the vulcanization is carried to a point of complete vulcanization.

Figure 3:
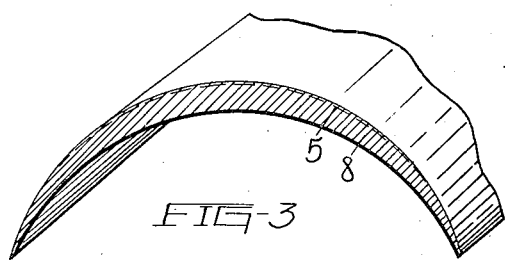
Figure 3 is a section through the compression element reversed after vulcanization, to obtain the compression within the layer.

The compression layer in the condition described and indicated by the numeral 8 is now stripped from the core 2 and turned inside out, which condition is illustrated in Figure 3, with the layer of fabric on the outside of the layer. By turning the layer inside out, the inner surface becomes the outer surface and the now inner portion of the rubber is compressed so as to afford a self sealing structure in case of a puncture. In making a ring of rubber by the method described, the compression layer will remain in the form shown in Figure 3 without any tendency to turn outwardly. It is also to be noted that in turning the compression layer inside out the diameter of the layer is appreciably decreased, so that the excess over the completed diameter is absorbed.

Figure 4:
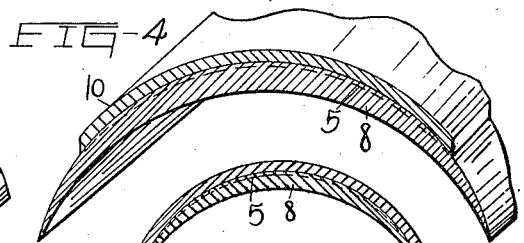
Figure 4 is a view showing the layer of Figure 3 with a portion of the outer wall of the tube therein.
Figure 6:
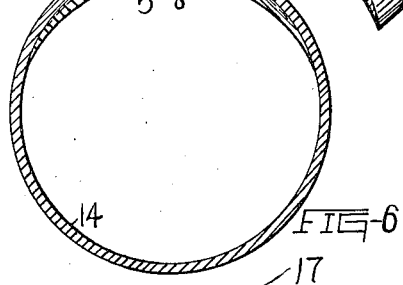
Figure 6 is a cross-section of a complete tube.

To construct a tube incorporating the compression layer, the now outer surface of layer is buffed and cemented and a layer of unvulcanized rubber 10 is applied to the central region of the compression layer. This rubber is compounded to cure in a short time and is of a composition to form the outer wall of the inner tube. The compression layer is shown in Figure 4 and is next applied to a partially constructed tube (Figure 5) in a slightly stretched form, causing the outer edges to flare as shown in Figure 5.

Figure 5:
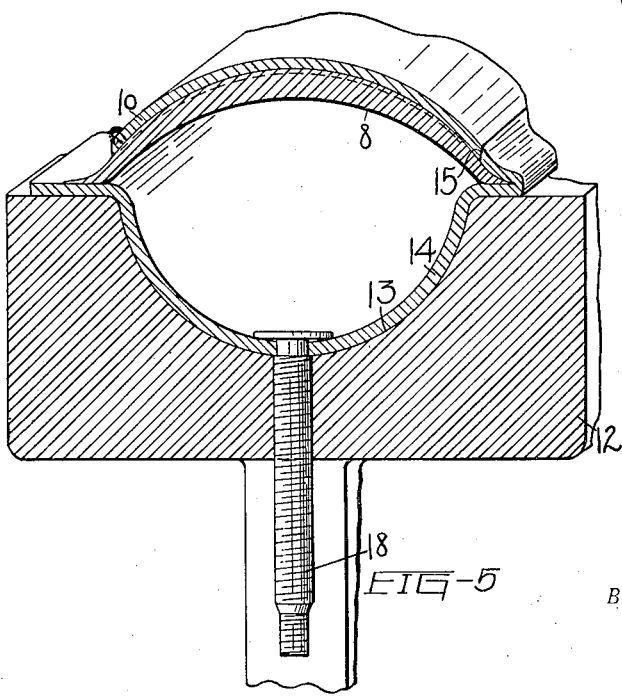
Figure 5 is a view showing the preferred method of assembling the tube.
Figure 7:
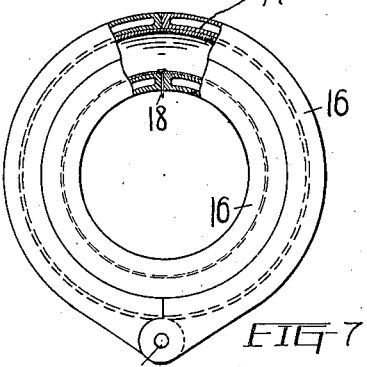
Figure 7 is a side view of a tube mold, a portion being broken away to disclose the tube in position therein.

In Figure 5 a ring-shaped form 12 is shown, having a trough-shaped recess 13 about its outer periphery, into which the layer of rubber 14, similar in composition to the layer 10, is applied and held in place by vacuum, if necessary. The edges of the layer 14 project over the edges of the form and the layer 8 is laid over the form as shown in Figure 5. The edges of the layer 14 are now brought around the edges of the layer 8 and joined to the layer 10 at 15 and cemented to the outer part of the ring, Figure 3, from joint 15 to the outer edge of Figure 3 only. If desired, the joint 15 may be skived. When the joint has been completed, the tube structure is removed from the ring-shaped form and slightly pre-inflated which causes it to assume a spherical cross-sectional ring-shaped form. The tube is then ready for vulcanization.

This last operation is performed in ring-shaped mold sections 16, the outer one of which may be hinged at 20, which sections are usually provided with steam cavities 17 by which the tube is heated to the temperature of vulcanization. The interior of the tube is connected to a source of fluid under pressure which holds the walls of the tube against the mold cavity through the usual valve stem 18. In the short cure usually required for the tube stock, which is usually about one-fifth or one-sixth of the time required for the layer 8, the tube is completely cured before the compression effect in the compression layer can be affected by the temperature in curing the outer tube wall. The composition of the compression layer is such that the temperature and interval of vulcanization will not destroy or affect the state of compression in the layer 8.

The finished tube will be found to possess superior puncture-healing properties and will not break down quickly as the various elements thereof are in their natural position. The fabric will resist transverse elongation of the tube, but will not affect the circumferential expansion of the tube. The arrangement of the cords, both as to the curved ends or termini of the loops and their staggered relationship, will prevent tearing or failure at the edges of the reinforcement. It will be noted further that the tube as manufactured by this process assumes a naturally rounded cross-section and does not rely upon the pressure of the air within the tire for shaping the tube outwardly to fill the chamber within the tire. In many of the forms of puncture proof tubes previously designed, wherein air pressure is relied upon to secure the inversion of the curve in the upper part of the tube to obtain the compression, the

What is claimed is:

1. The process of manufacturing puncture proof tubes, comprising the steps of forming a ring of rubber having a substantially crescent-shaped cross-section and of a comparatively slow curing compound, the diameter of the ring being larger than the completed tube, vulcanizing the rubber for a period of time sufficient to complete the cure thereof, reversing the ring so as to place it under compression, applying a portion of the outer wall of the tube to the exterior of the ring, assembling the parts with the balance of the exterior of the tube so that the compressed ring lies interiorly of the tube, the exterior of the tube being of a comparatively fast curing compound, and vulcanizing the outer wall of the tube without affecting the ring.

2. The process of manufacturing puncture proof tubes, comprising the steps of forming a ring of rubber having a thickened central zone and tapering edges, the rubber requiring a long cure to complete vulcanization, vulcanizing the ring and placing it under compression by turning it inside out, assembling the ring in a tube composed of rubber requiring only a short cure, and curing the tube.

3. The process of manufacturing puncture proof tubes, comprising the steps of forming a ring of rubber having a thickened central zone and tapering edges, the rubber requiring a long cure to complete vulcanization, vulcanizing the ring and placing it under compression by turning it inside out, assembling the ring in the interior of a tube composed of rubber requiring only a short cure, and curing the tube.

4. The process of manufacturing puncture proof inner tubes, comprising the steps of vulcanizing a ring of rubber having a transverse curvature, the ring being larger in diameter than the completed tube, turning the ring inside out, thereby reducing the diameter and placing the rubber under compression, assembling the ring in the interior of a tube and vulcanizing it in place therein.

5. The process of manufacturing puncture proof inner tubes, comprising the steps of vulcanizing a ring of rubber having a transverse curvature, the ring being larger in diameter than the completed tube, turning the ring inside out, thereby reducing its diameter and placing the rubber under compression, the ring being arched outwardly, and permanently vulcanizing the ring in position in the interior of an inner tube construction while maintaining the circular cross-section of the tube.

6. The process of manufacturing puncture proof inner tubes, comprising the steps of vulcanizing a ring of rubber having a transverse curvature, turning the ring inside out, thereby placing the rubber under compression, assembling the ring with uncured rubber to form the body of the tube, and vulcanizing the body of the tube with the ring without destroying the compression in the ring.

7. The process of manufacturing puncture proof inner tubes, comprising the steps of vulcanizing a ring of rubber having a transverse curvature, turning the ring inside out, thereby placing the rubber under compression, securing the ring in the interior of an uncured rubber tube construction, and vulcanizing the tube without destroying the compression in the ring.

8. The process of manufacturing puncture proof inner tubes, comprising the steps of vulcanizing a ring of rubber having a transverse curvature, turning the ring inside out, thereby placing the rubber under compression, assembling the ring with uncured rubber to form the body of the tube, and vulcanizing the body of the tube in circular form with the ring without destroying the compression in the ring.

9. The process of manufacturing puncture proof inner tubes, comprising the steps of vulcanizing a ring of rubber having a transverse curvature, turning the ring inside out, thereby placing the rubber under compression, securing the ring in the interior of an uncured rubber tube construction, and vulcanizing the tube in circular form with the ring without destroying the compression in the ring.

10. The process of manufacturing puncture proof inner tubes, comprising forming a ring of rubber having a cord embedded therein in ogee curves arranged transversely of the ring, vulcanizing the ring, reversing the ring, assembling the ring with an uncured tube, and vulcanizing the tube with the ring while in circular form.

11. The process of manufacturing puncture proof inner tubes, comprising forming a ring of rubber having a cord embedded therein in ogee curves of long and short lengths alternately, arranged transversely of the ring, vulcanizing the ring, reversing the ring, assembling the ring with an uncured tube, and vulcanizing the tube with the ring while in circular form.

12. The process of manufacturing puncture proof inner tubes, comprising forming a ring of rubber having a fabric layer embedded therein about its inner surface, reversing the ring whereby the fabric is situated outside of the ring, assembling the ring with the body of a tube in unvulcanized condition, and vulcanizing the tube with the ring without destroying the compression within the ring.

13. The process of manufacturing puncture proof inner tubes, comprising forming a ring of rubber having a fabric layer embedded therein about its inner surface, reversing the ring whereby the fabric is situated outside of the ring, assembling the ring with the body of a tube in unvulcanized condition, and vulcanizing the tube in circular form with the ring without destroying the compression within the ring.

14. The process of manufacturing puncture proof inner tubes, comprising forming a ring of rubber having a fabric layer embedded therein about its inner surface, reversing the ring whereby the fabric is situated outside of the ring, assembling the ring interiorly of the body of a tube construction in unvulcanized condition, and vulcanizing the tube with the ring without destroying the compression within the ring.

OTTO J. KUHLKE.